(12) United States Patent  (10) Patent No.: US 9,335,896 B2
Maeda  (45) Date of Patent: May 10, 2016

(54) DISPLAY CONTROL APPARATUS, METHOD, AND STORAGE MEDIUM IN WHICH AN ITEM IS SELECTED FROM AMONG A PLURALITY OF ITEMS ON A TOUCHSCREEN DISPLAY

(71) Applicant: CANON KABUSHIKI KAISHA, Tokyo (JP)

(72) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 13/803,147

(22) Filed: Mar. 14, 2013

(65) Prior Publication Data
US 2013/0268893 A1  Oct. 10, 2013

(30) Foreign Application Priority Data

Apr. 6, 2012  (JP) ................................ 2012-087931

(51) Int. Cl.
*G06F 3/0482* (2013.01)
*G06F 3/0488* (2013.01)

(52) U.S. Cl.
CPC ............ *G06F 3/0482* (2013.01); *G06F 3/0488* (2013.01)

(58) Field of Classification Search
CPC .............. G06F 9/4443; G06F 3/04842; H04N 21/4312
See application file for complete search history.

(56) References Cited

U.S. PATENT DOCUMENTS

| 8,495,493 | B2 * | 7/2013 | Ha et al. | ......................... 715/702 |
| 2006/0053387 | A1 * | 3/2006 | Ording | ........................... 715/773 |
| 2009/0093275 | A1 * | 4/2009 | Oh | ......................... G06F 3/0482 455/566 |
| 2009/0295745 | A1 * | 12/2009 | Qian | .................... G06F 3/04886 345/173 |
| 2010/0066764 | A1 * | 3/2010 | Refai | ................... G06F 3/04886 345/660 |
| 2011/0072394 | A1 * | 3/2011 | Victor | .................... G06F 3/0482 715/821 |
| 2011/0107209 | A1 * | 5/2011 | Ha | ......................... G06F 3/0488 715/702 |
| 2011/0138275 | A1 * | 6/2011 | Yu | ....................... G06F 3/04886 715/702 |
| 2013/0127749 | A1 * | 5/2013 | Yamamoto | ............ G06F 3/0488 345/173 |

FOREIGN PATENT DOCUMENTS

JP  2010-113441 A  5/2010

* cited by examiner

*Primary Examiner* — Jeffrey A Gaffin
*Assistant Examiner* — Mandrita Brahmachari
(74) *Attorney, Agent, or Firm* — Fitzpatrick, Cella, Harper & Scinto

(57) ABSTRACT

This invention relates to a display control apparatus and method capable of appropriately, easily selecting a display item the user wants on a display of a plurality of display items. In one embodiment of the invention, a plurality of display items are arranged on a display screen to cause the display screen having a touch panel to display the plurality of display items as selectable candidates. A first display item is selected among the plurality of display items displayed on the display screen. In a case where the first display item is selected and a touch area in the touch panel is designated by a user, a second display item which is closer to the first display item than the touch area in the display screen is selected.

21 Claims, 10 Drawing Sheets

DISPLAY CONTROL APPARATUS, METHOD, AND STORAGE MEDIUM IN WHICH AN ITEM IS SELECTED FROM AMONG A PLURALITY OF ITEMS ON A TOUCHSCREEN DISPLAY

BACKGROUND OF THE INVENTION

1. Field of the Invention

The present invention relates to a display control apparatus and display control method.

2. Description of the Related Art

A conventional apparatus generally has a mode in which a plurality of images are two-dimensionally arrayed and displayed based on a predetermined array to improve an overview of images, and the user selects one of them. Improved display ability along with higher resolutions of recent display screens enables ensuring visibility even in a reduced display, and quite a number of apparatuses have a mode in which a larger number of images are displayed at a time.

However, an image display apparatus which includes a touch panel and allows the user to select an image by a touch operation has high possibility of an erroneous operation in which the user touches an adjacent image owing to a small display image size. For example, when a plurality of images are two-dimensionally arrayed in time series by folding a predetermined array on the display screen, if the user touches an erroneous image in an adjacent direction in time series, the adjacent associated image is selected. In this case, it is easy to cancel the selection and select an image again. In contrast, if the user touches an erroneous image in a direction perpendicular to the adjacent direction in time series, the image apart in time series is selected, so it is difficult to cancel the selection and select an image again.

As a countermeasure against an erroneous touch operation in a multiple-image display mode, there has conventionally been proposed a technique of, when the user touches a plurality of frames, shifting to a mode in which the image interval is increased, and prompting him to select an image again, as disclosed in Japanese Patent Laid-Open No. 2010-113441.

However, the method disclosed in Japanese Patent Laid-Open No. 2010-113441 has the following problem.

That is, the method increases operational procedures more than necessary because an adjacent direction in a predetermined array is not considered, and the image display apparatus shifts to the mode in which the image interval is increased, even for an erroneous touch operation in an adjacent direction in which it is easy to cancel the selection and select an image again. As a result, the user needs to perform a cumbersome operation, which is undesirable in terms of the user interface.

SUMMARY OF THE INVENTION

Accordingly, the present invention is conceived as a response to the above-described disadvantages of the conventional art.

For example, a display control apparatus and display control method according to one embodiment of this invention are capable of appropriately and easily selecting a display item the user wants from a display of a plurality of display items.

According to one embodiment of the present invention, there is provided a display control apparatus. This apparatus comprises: a display control unit configured to cause a display screen having a touch panel to display a plurality of display items as selectable candidates, by arranging the plurality of display items on the display screen; a first selection unit configured to select a display item among the plurality of display items displayed by the display control unit; and a second selection unit configured, in a case where a first display item is selected by the first selection unit and a touch area in the touch panel is designated by a user, to select a second display item which is closer to the first display item than the touch area in the display screen.

According to another embodiment of the present invention, there is provided a display control method. The method comprises: arranging a plurality of display items on a display screen to cause the display screen having a touch panel to display the plurality of display items as selectable candidates; selecting a display item among the plurality of display items displayed on the display screen; and selecting, in a case where a first display item is selected by the first selecting and a touch area in the touch panel is designated by a user, a second display item which is closer to the first display item than the touch area in the display screen.

According to another embodiment of the present invention, there is provided a non-transitory computer readable storage medium which stores a computer program. The computer program executes each step of the above method.

The embodiment according to the invention is particularly advantageous since a display item the user wants can be appropriately and easily selected from a display of a plurality of display items.

Further features of the present invention will become apparent from the following description of exemplary embodiments (with reference to the attached drawings).

DESCRIPTION OF THE EMBODIMENTS

Figure 1:
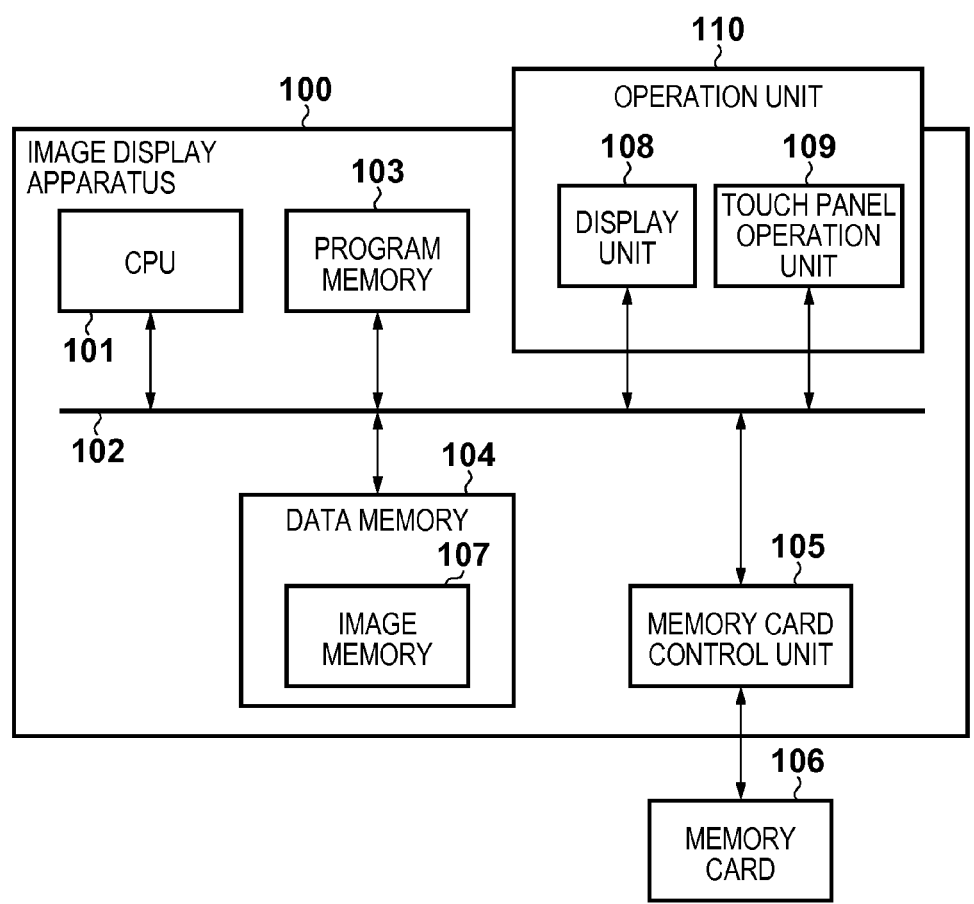
FIG. 1 is a block diagram showing the arrangement of an image display apparatus as an exemplary embodiment of the present invention.

Exemplary embodiments of the present invention will now be described in detail in accordance with the accompanying drawings. Note that the same reference numerals denote the same parts, and a repetitive description thereof will be omitted.

FIG. 1 is a block diagram showing the arrangement of an image display apparatus 100 as an exemplary embodiment of the present invention.

A CPU 101 in the form of a microprocessor operates in accordance with a control program stored in a program memory (ROM) 103 and the contents of a data memory (RAM) 104, which are connected via an internal bus 102. The CPU 101 controls access to a detachable memory card (data storage medium) 106 via a memory card control unit 105, reads out image data and the like stored in the memory card 106, and stores them in an image memory 107 set in the data memory 104.

The image display apparatus 100 includes an operation unit 110 having a display unit 108 such as an LED or color LCD, and a touch panel operation unit 109 arranged on the screen of the display unit. The CPU 101 controls the touch panel operation unit 109. More specifically, the touch panel operation unit 109 detects the coordinates (touch position), range, and operation direction of a touch operation to the touch panel, the number of touched areas, and the like. The CPU 101 acquires information for specifying the contents detected by the touch panel operation unit 109, and performs control according to the information. Also, the CPU 101 displays data on the display unit 108 based on image data stored in the image memory 107 and data stored in the program memory 103.

Figure 2:
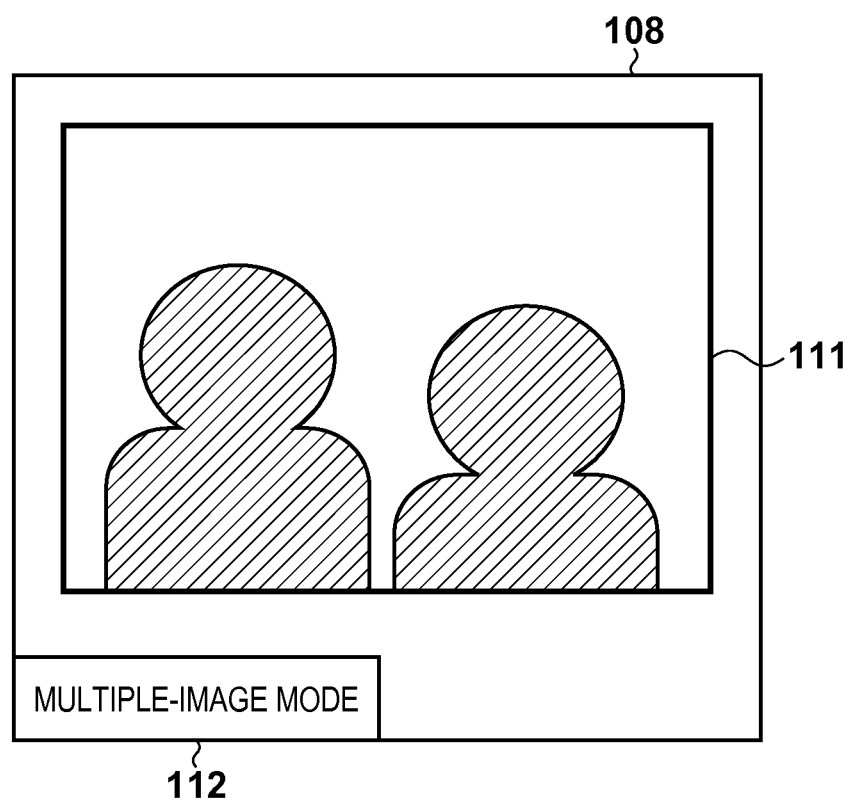
FIG. 2 is a view showing display contents in a single image display mode.

FIG. 2 is a view showing the display contents of the display unit 108 in a single image display mode. In the single image display mode, one image is displayed large at an image display portion 111 at the center of the screen of the display unit. By a so-called flick operation of tracing and flicking the image display portion 111 with a finger, a plurality of images corresponding to image data stored in the memory card 106 can be displayed while being sequentially fed forward or backward in an order determined according to a predetermined condition.

A function button 112 is displayed at a lower portion on the screen. By touching the function button 112, the display mode can shift to a multiple-image display mode to be described later.

Several embodiments of image display control on the display screen of the image display apparatus having the above arrangement will be described below.

First Embodiment

Figure 3:
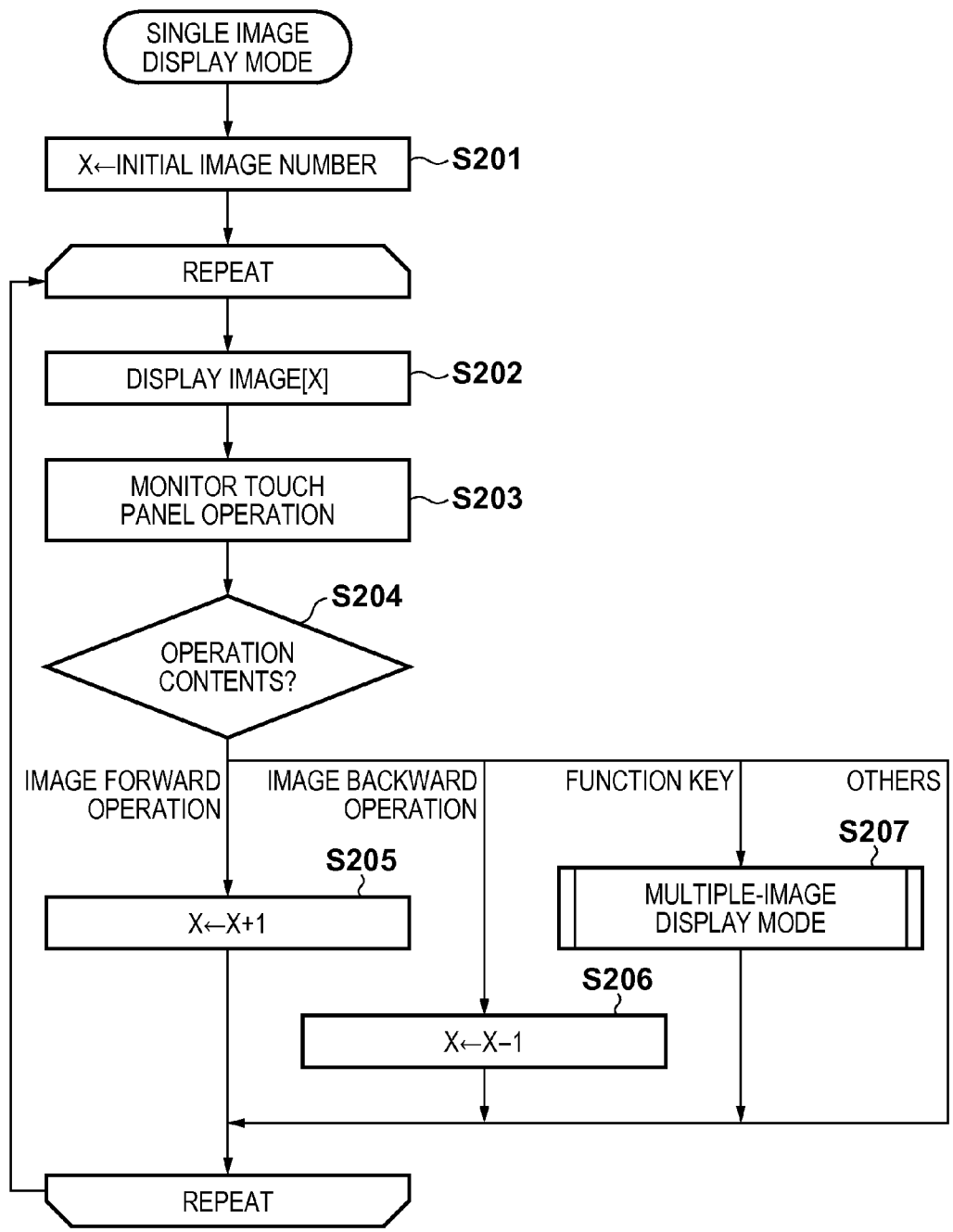
FIG. 3 is a flowchart showing processing in the single image display mode.

FIG. 3 is a flowchart showing the processing contents of a CPU 101 in the single image display mode.

Prior to the start of processing, in step S201, the CPU 101 stores, in a variable (X) for storing the number of an image to be displayed, the number of an image to be displayed first.

As is apparent from FIG. 3, steps S202 to S207 form a processing loop. First, in step S202 of the processing loop, an image of the image number X is displayed at an image display portion 111. Then, in step S203, the process waits for a touch panel operation by the user. If the touch panel operation is performed, the process advances to step S204 to identify the operation contents.

If the user operation is an image forward operation, the process advances to step S205 to increment the variable (X) by one. That is, the variable (X) is updated to display an immediately succeeding image in a predetermined order.

If the user operation is an image backward operation, the process advances to step S206 to decrement the variable (X) by one. That is, the variable (X) is updated to display an immediately preceding image in the predetermined order. If the user operation is a function key operation in step S204, the process advances to step S207 to execute the multiple-image display mode to be described later. By repeating steps S202 to S207, the single image display mode is executed.

Figure 4:
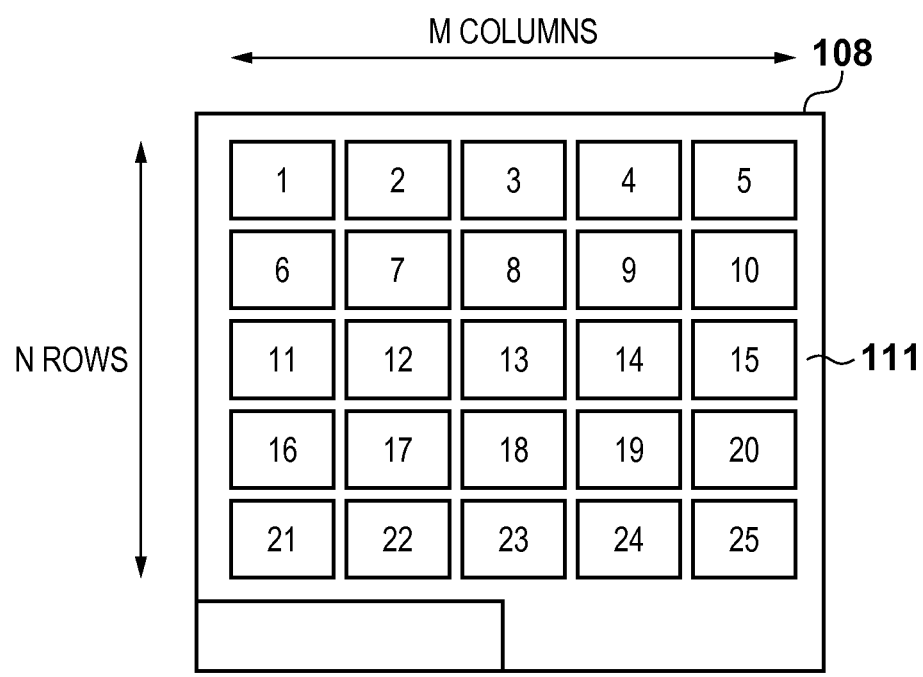
FIG. 4 is a view showing display contents in a multiple-image display mode.

FIG. 4 is a view showing an outline of an image display method in the multiple-image display mode.

In the multiple-image display mode, as shown in FIG. 4, M×N images are two-dimensionally displayed at the image display portion 111, and the user can confirm the contents of a plurality of images at a time. FIG. 4 shows a display of 5×5 images, and images stored in a memory card 106 are arrayed and displayed in the order of image numbers 1 to 25 based on a predetermined condition.

The predetermined condition is, for example, date & time information when an image was captured. The image capturing date & time is stored at the header of an image file created when an image was captured. The CPU 101 reads out the image capturing dates & times of respective image files, and displays images in time series according to these image capturing dates & times. However, the condition is not limited to this. In a case where images stored in the memory card 106 exceed the number of images displayable at a time (in this case, 25 images), the user can flip pages by a flick operation, similar to the single image display mode. Also, when the user touches and selects one of displayed images, the multiple-image display mode can shift to the single image display mode. In the multiple-image display mode, the CPU 101 can change the display form such as brightness for each displayed image, thereby highlighting a specific image or images.

Figure 5A:
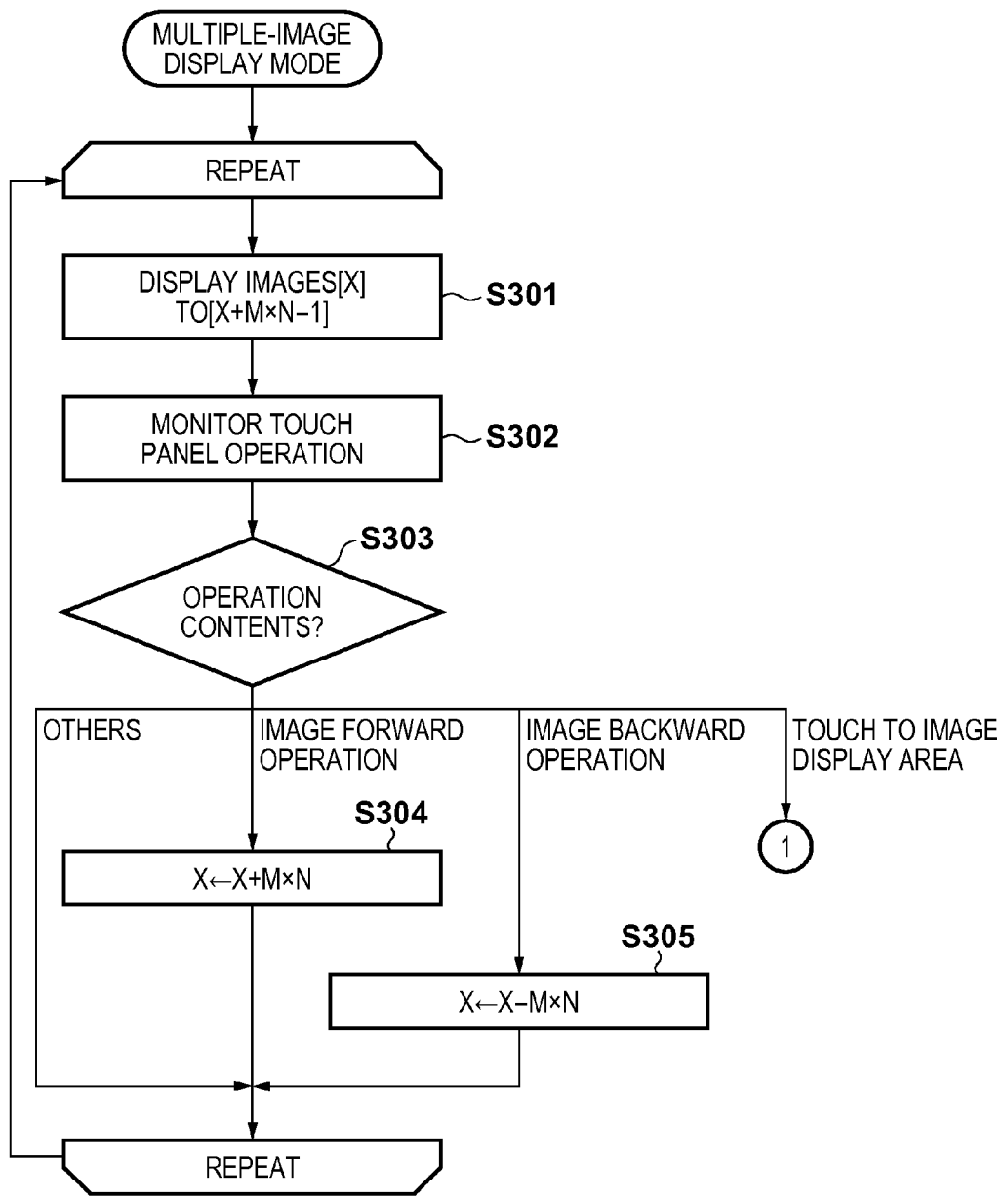
FIGS. 5A and 5B are flowcharts showing processing in the multiple-image display mode.
Figure 5B:
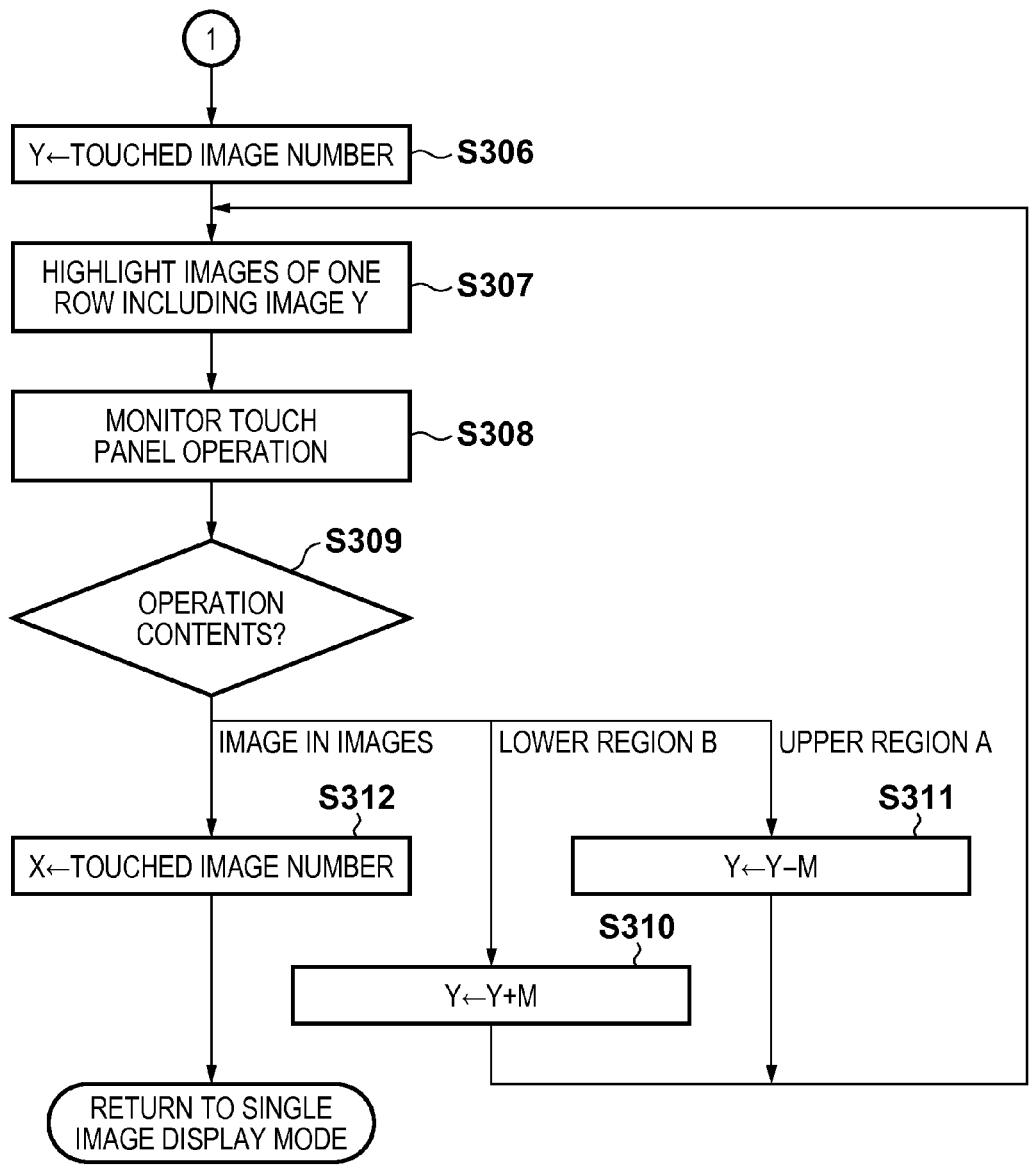

FIGS. 5A and 5B are flowcharts showing the processing contents of the CPU 101 in the multiple-image display mode.

In the loop of the multiple-image display mode, in step S301, M×N images starting from the number (X) of an image displayed in the single image display mode are displayed as processing target candidates at the image display portion 111. In step S302, the process waits for a touch panel operation by the user. If the touch panel operation is performed, the process advances to step S303 to identify the operation contents.

If the user operation is a page forward operation, the process advances to step S304 to add, to the variable (X), the image display count M×N of one page. If the user operation is a page backward operation, the process advances to step S305 to subtract M×N from the variable (X). If the user operation is a touch operation to an image at the image display portion 111, the process advances to step S306 to store the number of the touched image in a variable (Y). If the touch area straddles a plurality of images in step S306, an image touched with a largest area is discriminated to select one image and store the number of the image in the variable (Y). After the processing in step S304 or S305, the process returns to step S301 to perform image display complying with a page forward operation or page backward operation.

If the process advances to step S307, one row including the image number (Y), that is, M images are highlighted, and the remaining images are displayed at low brightness (first selection display). With this setting, M images and the remaining images become easily discriminable. In step S308, the process waits again for a touch panel operation by the user. If the touch panel operation is performed again, the process advances to step S309 to identify the operation contents. In the highlighted display (first selection display), not images of one row including the image number (Y), but images of one column including the image number (Y) may be displayed.

If the touch operation by the user is a touch operation to an image in the highlighted images, the process advances to step S312 to store the number of the touched image in the variable (X), and then the multiple-image display mode ends. After that, the display mode returns to the single image display mode, and the image X touched in step S308 is displayed.

If the touch operation in step S308 is a touch operation to an area B below the highlighted images, the process advances to step S310 to add, to the variable (Y), the display image count M of one row. In response to this, a row to be highlighted changes to a row arranged immediately below a currently highlighted row. Note that details of the lower area B will be described later. If the touch operation in step S308 is a touch operation to an area A above the highlighted images, the process advances to step S311 to subtract M from the variable (Y).

Figure 6:
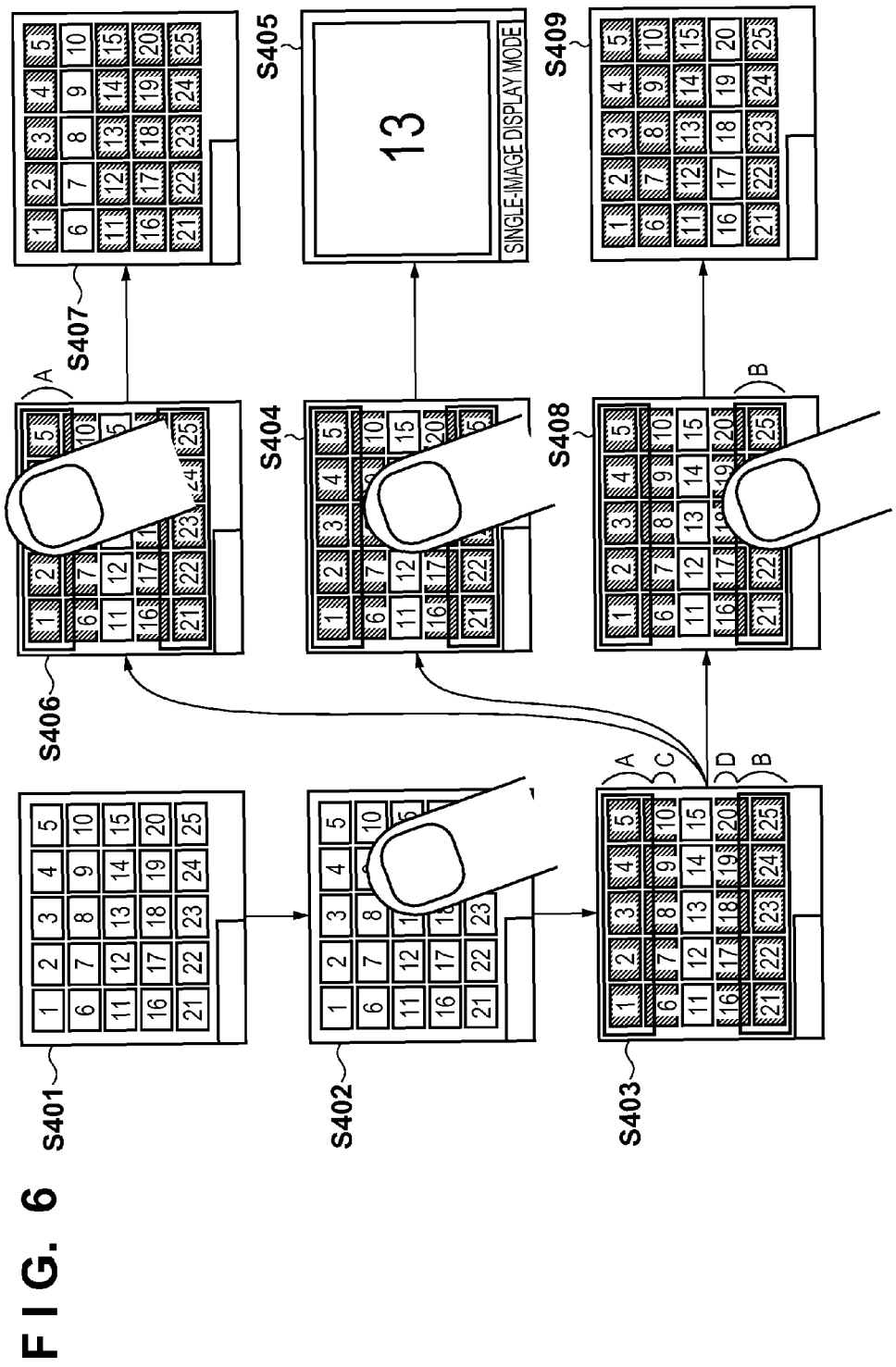
FIG. 6 is an operation flow view showing transition of screen display contents.

FIG. 6 is an operation flow view showing state transition of screen display contents.

The start state (S401) is the multiple-image display mode. If one image (image 14) is touched (S402), the display screen shifts to S403, and images 11 to 15 which include touched image 14 and its adjacent images in a predetermined order are highlighted (S403).

If any one (image 13 in this case) of the highlighted images is touched by a next touch operation (S404), the display mode shifts to the single image display mode to display touched image 13 (S405).

If the user's finger touches the screen with a horizontal shift in the second touch operation, an adjacent image not intended by the user may be selected and displayed. However, this image is an image adjacent to the intended image in a predetermined order, so no big issue occurs because the image the user wants can be obtained by flipping one page left or right in the single image display mode.

If the user touches an area A (S406) above the highlighted images in the highlighted display state (S403), images 6 to 10 adjacent to the area A are highlighted (S407). Similarly, if the user touches a lower area B (S408) in the highlighted display state (S403), adjacent images 16 to 20 are highlighted (S409).

However, in the embodiment, insensitive areas C and D each having a predetermined width and length are defined between the area of highlighted images 11 to 15, and the upper area A and lower area B in the highlighted display state (S403). Even if the insensitive area is touched, the touch operation is ignored, and no operation is performed. This can prevent a change of the highlighted display and selection of an image not intended by the user.

Even if the area A or B where images are arranged by two rows above or below a currently highlighted row is touched, the highlighted display moves up or down by only one row of images. Thus, even if the user cannot touch a row adjacent to the currently highlighted (selected) row, the adjacent row can be highlighted and selected (second selection display).

For example, when many images are displayed on the display screen and the size of one image is small, even if the user cannot appropriately touch an image he wants to select, this image can be appropriately selected.

The above-described embodiment restricts the highlighted display to move by each row. Even if the user touches the touch panel with a vertical shift in the second touch operation, the embodiment can prevent unintentionally moving the highlighted display.

In the above-described embodiment, when images are aligned in time series, individual processing is executed for each column. That is, when images 11 to 15 are highlighted and an area where one of images 11 to 15 is arranged is touched, an image in this area is selected as a processing target. A shift of the column is a shift of one image in time series of images. Hence, even if the user selects an erroneous column, he can quickly select an image he wants in the single image display mode.

To the contrary, when the user selects a row different from one he wants, the image shifts by images of the number of rows corresponding to the touch shift×one row in time series. It sometimes becomes difficult or troublesome to display an image the user wants in the single image display mode. Therefore, the embodiment restricts row selection to move the highlighted display by each row, as shown in FIGS. 5 and 6. The user can easily select a row or column adjacent to a currently selected row or column.

In the above embodiment, a row designated by the user is highlighted first in steps S402 and S403. Alternatively, a predetermined row such as the top row or center row may be highlighted and selected first.

Note that the embodiment has described an example in which the image forward operation and image backward operation in the single image display mode and multiple-image display mode are performed by a flick operation to the touch panel. However, the present invention is not limited to this. For example, icons for designating the image forward operation and image backward operation may be displayed and tapped, or an operation key arranged at a portion other than the touch panel screen may be used.

The above embodiment sets the insensitive areas C and D where no reaction occurs to a touch operation by the user. However, the present invention is not limited to this, and when the area C or D is touched, the same processing as that for the area A or B may be executed. In this case, the highlighted display moves up by one row when an area above a currently highlighted display is touched, and down by one row when an area below the highlighted display is touched. That is, the user can move the highlighted display by each row by touching an area corresponding to a direction in which he wants to move the highlighted display.

In this case, the user can move the highlighted display by touching the touch panel to highlight the touched area, and performing a flick operation to move the highlighted display while maintaining the touched state. The user can appropriately, easily select an image by a flick operation in a direction he wants.

By the processes in steps S310 and S311 of FIG. 5, even an image not serving as a display target on the display screen can be newly set as a display target by touching the area A or B by the user. When the user repetitively touches the area A or B, images are scrolled on the display screen.

In step S309 of FIG. 5, it is also possible to determine a page forward operation or page backward operation, and feed forward or backward pages. As the determination processing, page forward processing, and page backward processing, the same processes as those in steps S303 to S305 can be performed.

Second Embodiment

The first embodiment has described a case where, when the user taps the upper area A or lower area B above or below a highlighted area in screen transition state S403 shown in FIG. 6, the highlighted area moves up or down.

The second embodiment will describe a case where images to be highlighted are always arranged at the center of the screen. Note that processing in the single image display mode and processing in the multiple-image display mode in the second embodiment are the same as those described with reference to FIGS. 3 and 5 in the first embodiment, and a description thereof will not be repeated. Transition of screen display contents in the second embodiment is almost the same as that in FIG. 6 in the first embodiment, and only a difference will be explained.

Figure 7:
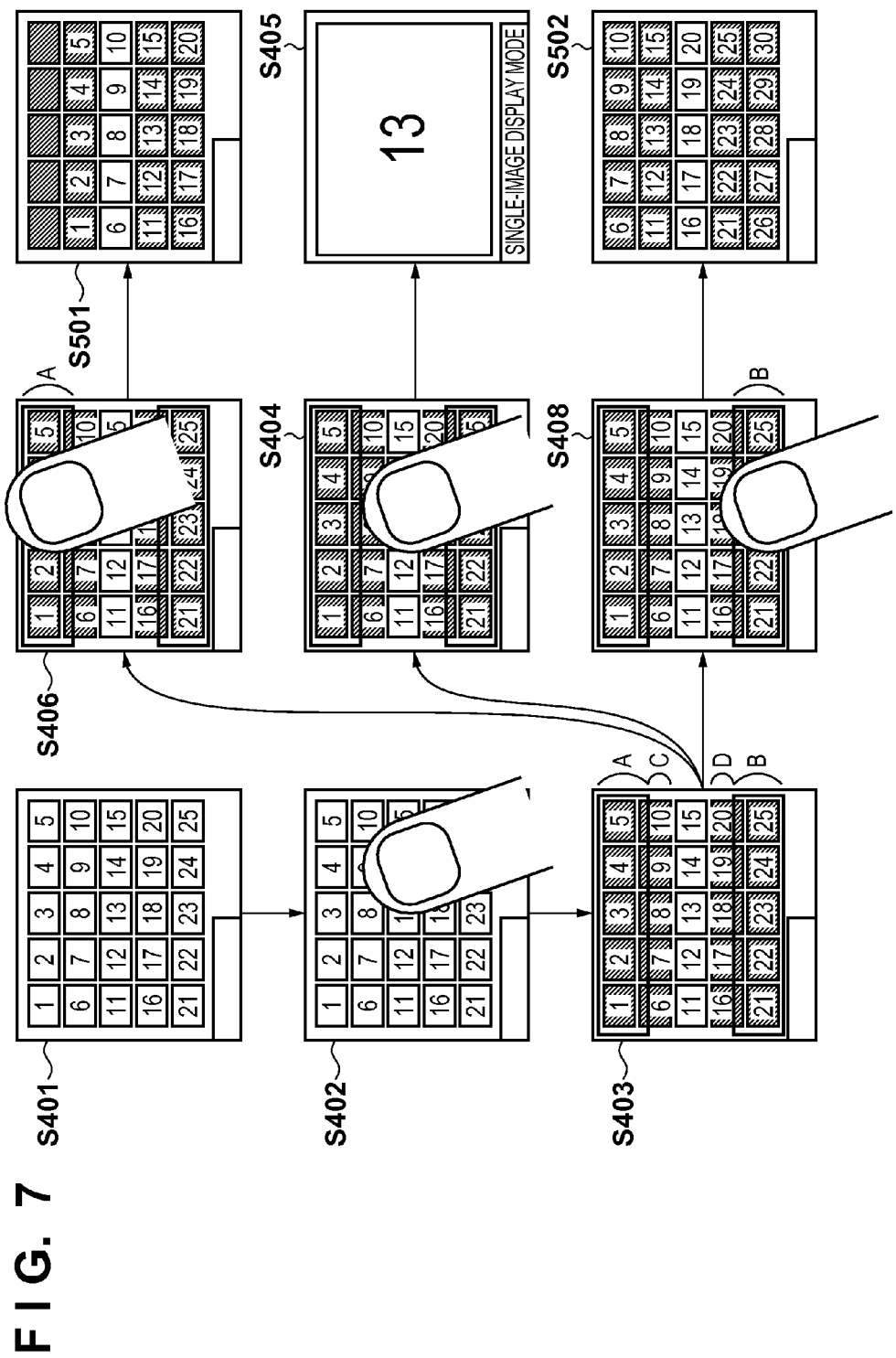
FIG. 7 is an operation flow view showing transition of screen display contents according to the second embodiment.

FIG. 7 is an operation flow view showing transition of screen display contents according to the second embodiment.

Referring to FIG. 7, when the user touches the area A in state S403 (state S406), the entire image display is scrolled so as to display images 6 to 10 adjacent to the area A at the center of the screen, and images 6 to 10 are highlighted (state S501).

In contrast, when the user touches the lower area B in state S403 (state S408), the entire image display is similarly scrolled so as to display adjacent images 16 to 20 at the center of the screen, and images 16 to 20 are highlighted (state S502).

According to the second embodiment, images to be highlighted are always displayed on a row at the center of the display screen after the first touch operation, improving the visibility of the images. Also, even when the user touches an upper or lower image on the screen by the first touch operation, the upper area A or lower area B can be satisfactorily ensured for the display.

Third Embodiment

In the first and second embodiments, even if the user touches an image intended by him in the first touch operation, the second touch operation is necessary, thus increasing the number of image selection operation steps. To prevent this, the third embodiment will describe a case where, when the first touch operation does not straddle images in the vertical direction, an image touched by the first touch operation is selected without performing the highlighted display and the second touch operation.

Note that processing in the single image display mode in the third embodiment is the same as that shown in FIG. 3 in the first embodiment, and transition of screen display contents in the third embodiment is the same as that in FIG. 6 in the first embodiment or FIG. 7 in the second embodiment, and a description thereof will not be repeated.

Also, processing in the multiple-image display mode in the third embodiment is almost the same as that in FIG. 5 in the first embodiment, and only a difference will be described.

Figure 8:
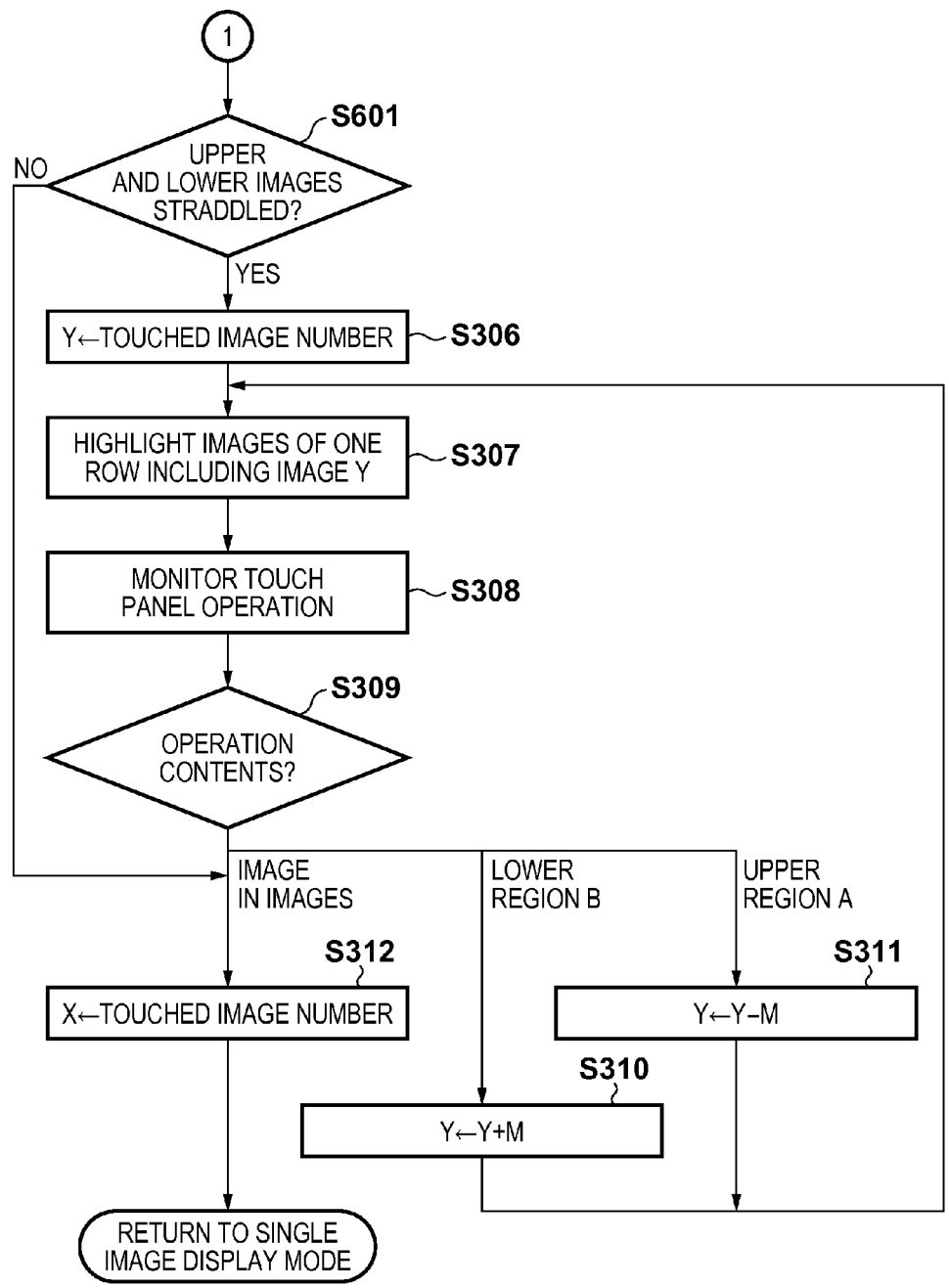
FIG. 8 is a flowchart showing processing in the multiple-image display mode according to the third embodiment.

FIG. 8 is a flowchart showing the processing contents of a CPU 101 in the multiple-image display mode according to the third embodiment. As is apparent from a comparison between FIGS. 8 and 5B, the same step reference numbers denote the same processes. Processing unique to the third embodiment is step S601.

If the touch panel operation by the user is a touch operation to an image display portion 111 in identification of processing contents in step S303, the process advances to step S601. Then, it is determined whether the touch operation range straddles a plurality of adjacent images in the vertical direction. In this determination, the area touched by the user and the size of an image displayed on the display screen at this time are compared, and if the area is larger than the image size, it is determined that the touch operation range straddles a plurality of images. If it is determined that the touch operation range straddles a plurality of images, the process advances to step S306 to perform the subsequent highlighted display and touch panel operation. To the contrary, if it is determined that the touch operation range does not straddle a plurality of images, the process advances to step S312 to store, in the variable (X), the image number of the image touched in step S302, and the multiple-image display mode ends. After that, the apparatus returns to the single image display mode, and the touched image is displayed as a selected image.

According to the above-described embodiment, if the first touch operation does not straddle images in the vertical direction, an image can be selected by one touch operation, decreasing the number of operation steps. If, for example, the display size of an image is small and the user cannot select one specific image and touches images on a plurality of rows, the screen shifts to the operation screen shown in FIG. 6 or 7. Hence, even if the user touches a plurality of rows, he can appropriately select an image.

Note that the third embodiment has described a case where, when the touch operation range does not straddle images in the vertical direction, the highlighted display and subsequent operations are not executed. However, it can also be controlled not to perform the highlighted display and subsequent operations only when the user touches only a single image in both the vertical and horizontal directions.

Fourth Embodiment

The fourth embodiment will explain a case where the highlighted display is performed at the same time as a touch by the first touch operation, and when the user confirms it and releases his touched finger without moving it, the highlighted display and subsequent operations are not performed.

Note that processing in the single image display mode in the fourth embodiment is the same as that shown in FIG. 3 in the first embodiment, and transition of screen display contents in the fourth embodiment is the same as that in FIG. 6 in the first embodiment or FIG. 7 in the second embodiment, and a description thereof will not be repeated. Also, processing in the multiple-image display mode in the fourth embodiment is almost the same as that in FIG. 5 in the first embodiment, and only a difference will be described.

Figure 9:
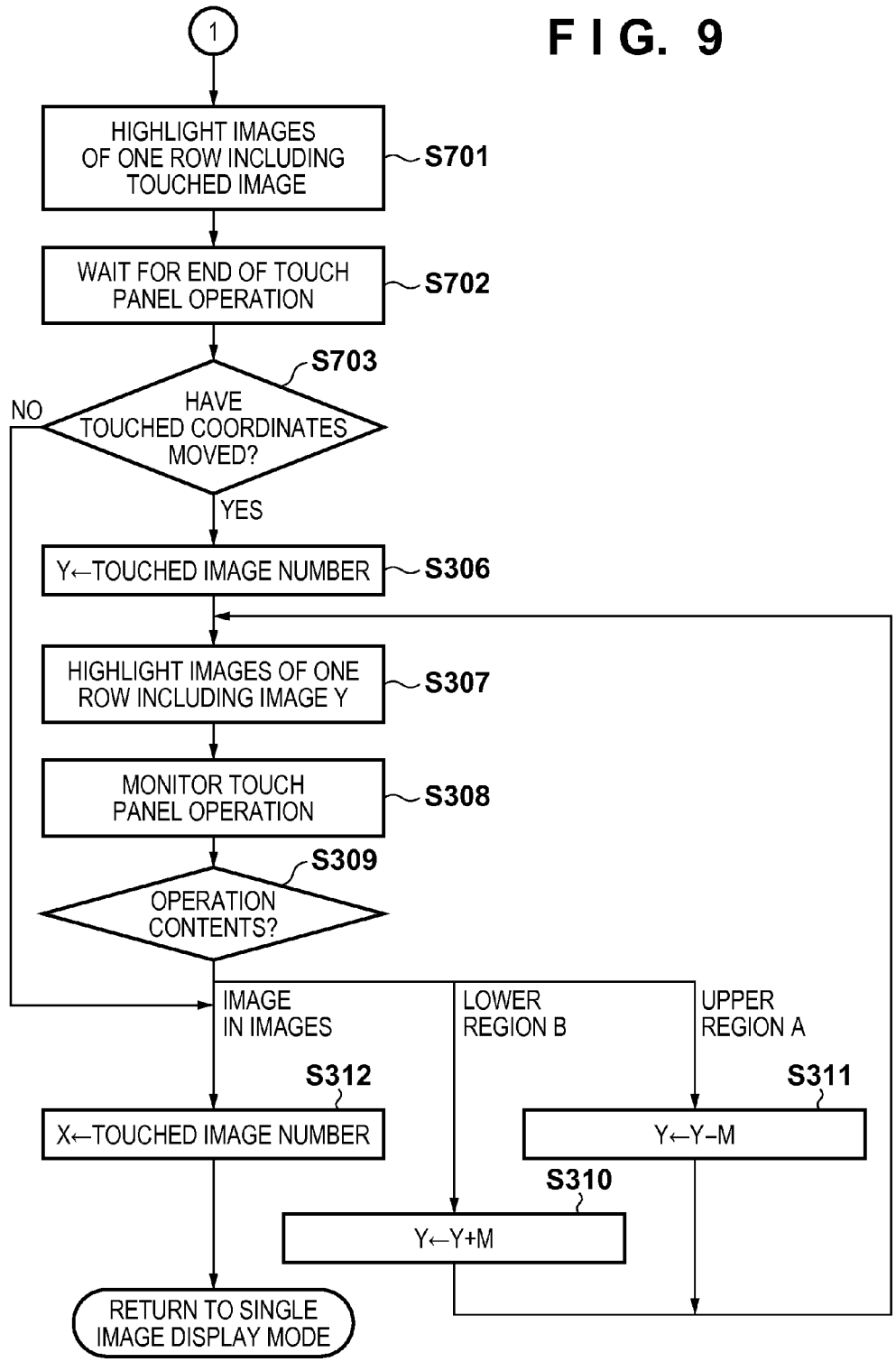
FIG. 9 is a flowchart showing processing in the multiple-image display mode according to the fourth embodiment.

FIG. 9 is a flowchart showing the processing contents of a CPU 101 in the multiple-image display mode according to the fourth embodiment. As is apparent from a comparison between FIGS. 9 and 5B, the same step reference numbers denote the same processes. Processes unique to the fourth embodiment are steps S701 to S703.

If the touch panel operation by the user is a touch operation to an image display portion 111 in identification of processing contents in step S303, the process advances to step S701. Then, images of one row including the touched image are highlighted, and the remaining images are displayed at low brightness.

In step S702, the process waits for the end of the touch panel operation by the user, that is, until his finger is released from the touch panel. Upon the completion of the touch panel operation, the process advances to step S703 to determine whether the coordinates of the touch position have moved during the touch panel operation. If it is determined that the coordinates have moved, the process advances to step S306 to perform the subsequent highlighted display and touch panel operation. To the contrary, if it is determined that the coordinates have not moved during the touch panel operation, the process advances to step S312 to store, in the variable (X), the number of the image touched in step S302, and the multiple-image display mode ends.

Therefore, the user can select an image he wants as a processing target by touching the image with his finger on the touch panel and releasing his finger from the touch panel without moving the touch position. In contrast, when the user touches the touch panel and moves the touch position by a flick operation or the like, the processing shown in FIG. 6 or 7 is performed. By switching the operation, the user can appropriately, easily select an image he wants as a processing target.

The above embodiment restricts the highlighted display to move by each row. Even if the user touches the touch panel with a vertical shift, the embodiment can prevent unintentionally moving the highlighted display. In the above embodiment, the highlighted display is moved by touching an area where an image is displayed. Thus, a special button, icon, or the like for moving the highlighted display need not be displayed, and the display area for displaying an image can be ensured wide.

Other Embodiments

In the first to fourth embodiments, a selected area is highlighted, and images in an area except for the selected area are displayed at low brightness. However, the present invention is not limited to this, and can adopt any method. For example, a selected area may be surrounded by a predetermined focus frame and displayed, or the display size or position may be changed between images in a selected area and those in an area except for the selected area.

Note that a row to be selected is changed one by one in the above embodiments, but the present invention is not limited to this. For example, a row to be selected may be changed in accordance with the number of rows corresponding to the distance between the position where a currently selected row is displayed, and a position designated by the user. That is, this distance may be compared with a threshold, and if the distance is equal to or larger than the threshold, the row may be changed by two or more rows. Alternatively, if the distance is equal to or larger than the threshold, a row at a position touched by the user may be set as a selection target candidate and highlighted.

If the user wants to change the row by one, he touches a position near the highlighted display, and if he wants to change the row by two or more, touches a farther position. Accordingly, the user can quickly designate a row he wants as a selection target.

In the above embodiments, only an image selected from highlighted images of one row is displayed on the display screen as in step S405. However, the present invention is not limited to this, and an image may be selected while maintaining the screen on which images are arrayed in a matrix. That is, in step S403, the focus is displayed on a selection target image. The focus moves in the lateral direction according to the flick operation when the user performs a flick operation in the lateral direction in the areas A to D. Then, when the user touches the focus, a focused image is determined as a processing target.

Further, when displaying a plurality of images, a plurality of modes may be arranged in accordance with the number of images and the image size. When the image size is smaller than a predetermined size upon mode selection, the above embodiments may be applied. In a case where images are small and an image not intended by the user is selected, the above embodiments can be appropriately applied to easily select an image. When the image size is sufficiently large, images at a position touched by the user are set as selection targets without applying the above embodiments. As a result, the user can quickly select images.

In the above embodiments, images of one row are highlighted as selection target candidates, but images may be processed not by a row but by a column. Also, images have been exemplified as display targets, but various display items such as icons, illustrations, or signs may be used as display targets. Note that a plurality of display items of one row or one column displayed on the display screen will be called a display item group.

The above embodiments have explained an example in which a row to be selected is changed in accordance with a direction designated by a touch by the user. However, the present invention is not limited to this. For example, when one direction is determined as the focus moving direction, an adjacent row in this direction may be selected regardless of a direction designated by a touch.

The above embodiments have explained an example in which a display item group including a plurality of display items of one row or one column is selected. However, the present invention is not limited to this, and an individual display item may be selected. In this case, when the user touches his/her desired display item, a display item adjacent to a currently selected display item is newly selected. The user can therefore easily select a display item he wants.

In the above embodiments, an adjacent display item is selected. However, the present invention is not limited to this, and it suffices to select a display item closer to a currently selected display item than a display item touched by the user. In the above embodiments, when the user touches a display item such as an image, a display item closer to a currently selected display item than a touched display item is selected. However, the embodiments according to this invention is applicable to a case where the user touches not only a display item but also any desired touch area. That is, when an area arbitrarily touched by the user is a position spaced apart from a selection candidate display item, the selection candidate display item closer to a currently selected display item than the touched area may be selected.

In the embodiments according to the present invention, the image display apparatus and the display control apparatus which controls it can be of arbitrary types such as the display unit of a multi-function printer, a mobile phone, a digital camera, a PDA, a tablet terminal, and a portable PC. Especially for a multi-function printer, smartphone, PDA, and PC, the image display apparatus 100 according to each of the embodiments can be implemented by an application program to be executed by the internal processor of each of them. It is therefore apparent that a computer program for implementing processing of the display control apparatus in each of the embodiments also falls within the scope of the invention.

For example, when a multi-function printer includes a memory card, loads image data stored in the memory card, and prints an image, it is especially useful for preview control to incorporate the display control apparatus as described in the above embodiments.

Since a computer program is generally stored in a computer-readable storage medium such as a CD-ROM, it is apparent that the computer-readable storage medium also falls within the scope of the invention. The computer program is not always executed by one computer (for example, a CPU), but the program according to each of the embodiments may be executed by a plurality of computers in cooperation with each other. It is also possible to arrange hardware such as a circuit for executing part of the program according to each of the embodiments, and implement the processing described in each of the embodiments by cooperation between the hardware and a computer such as a CPU for executing the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-087931, filed Apr. 6, 2012, which is hereby incorporated by reference herein in its entirety.

What is claimed is:

1. A display control apparatus comprising:
a memory configured to store a program; and
at least one CPU configured to perform a predetermined process by executing the program stored in the memory,
wherein the at least one CPU causes a display screen having a touch panel to display a first display item, a second display item and a third display item, as candidates to be selected as targets of a predetermined common processing, such that the second display item is arranged between the first display item and the third display item on the display screen, and
in a case where the first display item is still being selected in the display screen by a previous touch operation to a first touch area corresponding to the first display item, but not currently touched by a user, if a third touch area corresponding to the third display item in the touch panel is touched by the user, the at least one CPU selects the second display item as a target of the predetermined common processing even if a second touch area corresponding to the second display item is not touched by the user.

2. The apparatus according to claim 1, wherein in a case where the first display item is still being selected in a first selection mode out of a plurality of selection modes but not currently touched, and the third touch area is touched, the at least one CPU selects the second display item even if the second touch area is not touched by the user.

3. The apparatus according to claim 2, wherein in a case where the first display item is still being selected in a second selection mode out of the plurality of selection modes but not currently touched, and the third touch area is touched, the at least one CPU selects not the second display item but the third display item.

4. The apparatus according to claim 3, wherein the at least one CPU determines a selection mode from the plurality of selection modes in accordance with each size of the first display item, the second display item and the third display item, and executes the selection of the second display item or the third display item according to the determined selection mode.

5. The apparatus according to claim 3, wherein the at least one CPU further determines a selection mode from the plurality of selection modes in accordance with a result of whether the first touch area, the second touch area or third touch area has moved on the touch panel until an end of a touch to the touch panel after the touch panel is touched, and executes the selection of the second display item or the third display item according to the determined selection mode.

6. The apparatus according to claim 1, wherein the at least one CPU selects, as the first display item, a display item corresponding to a touch area touched by the user.

7. The apparatus according to claim 1, wherein the first display item, the second display item and the third display item are respectively a first image group, a second image group and a third image group, each including a plurality of images arranged in a line in a predetermined direction, and
the at least one CPU selects any image group of the first image group, the second image group and the third image group in accordance with a result of which touch area of the first touch area, the second area and the third touch area is touched.

8. The apparatus according to claim 1, wherein a touch area, which overlaps at least part of the second display item and the third display item, is set in the touch panel, and the at least one CPU selects the second display item in a case where the first display item is selected in the display screen and is touched by the user.

9. The apparatus according to claim 1, wherein in a case where any one of the first display item, the second display item and the third display item is selected, the at least one CPU executes the predetermined common processing.

10. The apparatus according to claim 1, wherein the apparatus is a printer.

11. The apparatus according to claim 1, wherein the apparatus is a mobile phone.

12. A display control method implemented by a CPU executing a program stored in a memory to perform a predetermined process comprising:
causing a display screen having a touch panel by the CPU to display a first display item, a second display item and a third display item, as candidates to be selected as targets of a predetermined common processing, such that the second display item is arranged between the first display item and the third display item on the display screen, and
in a case where the first display item is still being selected in the display screen by a previous touch operation to a first touch area corresponding to the first display item, but not currently touched by a user, if a touch area corresponding to the third display item in the touch panel is touched by the user, selecting the second display item as a target of the predetermined common processing by the CPU even if a second touch area corresponding to the second display item is not touched by the user.

13. The method according to claim 12, wherein in a case where the first display item is still being selected in a first selection mode out of a plurality of selection modes but not currently touched, and the third touch area is touched, the second display item is selected by the CPU even if the second touch area is not touched by the user.

14. The method according to claim 13, wherein in a case where the first display item is still being selected in a second selection mode out of the plurality of selection modes but not currently touched, and the third touch area is touched, not the second display item but the third display item is selected by the CPU.

15. The method according to claim 14, wherein in the second selecting, a selection mode is determined by the CPU from the plurality of selection modes in accordance with each size of the first display item, the second display item and the third display item, and the selection of the second display item or the third display item is executed by the CPU according to the determined selection mode.

16. The method according to claim 14, wherein a selection mode is determined by the CPU from the plurality of selection modes in accordance with a result of whether the first touch area, the second touch area or third touch area has moved on the touch panel until an end of a touch to the touch panel after the touch panel is touched, and
the selection of the second display item or the third display item is executed by the CPU according to the determined selection mode.

17. The method according to claim 12, a display item corresponding to a touch area touched by the user is selected by the CPU, as the first display item.

18. The method according to claim 12, wherein the first display item, the second display item and the third display item are respectively a first image group, a second image group and a third image group, each including a plurality of images arranged in a line in a predetermined direction, and any image group of the first image group, the second image group and the third image group is selected by the CPU in accordance with a result of which touch area of the first touch area, the second touch area and the third touch area is touched.

19. The method according to claim 12, wherein a touch area, which overlaps at least part of the second display item and the third display item, is set in the touch panel, and in a case where the first display item is selected in the display screen and is touched by the user, the second display item is selected by the CPU.

20. The method according to claim 12, wherein in a case where any one of the first display item, the second display item and the third display item is selected, the predetermined common processing is executed by the CPU.

21. A non-transitory computer readable storage medium which stores a computer program to be executed by a CPU for performing:

causing a display screen having a touch panel to display a first display item, a second display item and a third display item, as candidates to be selected as targets of a predetermined common processing, such that the second display item is arranged between the first display item and the third display item on the display screen, and in a case where a first display item is still being selected in the display screen by a previous touch operation to a first touch area corresponding to the first display item, but not currently touched by a user, if a third touch area corresponding to the third display item in the touch panel is touched by the user, selecting the second display item as a target of the predetermined common processing even if a second touch area corresponding to the second display item is not touched by the user.

\* \* \* \* \*